United States Patent [19]

Knowles

[11] Patent Number: 4,563,032
[45] Date of Patent: Jan. 7, 1986

[54] PULLING HEAD FOR REMOVABLY ENGAGING A CONDUIT END

[75] Inventor: John P. Knowles, Quito, Ecuador

[73] Assignee: Texaco Limited, London, England

[21] Appl. No.: 579,639

[22] Filed: Feb. 13, 1984

[51] Int. Cl.⁴ .............................................. B66C 1/28
[52] U.S. Cl. ..................................................... 294/90
[58] Field of Search ...................... 294/90, 91, 92, 89, 294/78 R, 82 R, 86 R, 102 A

[56] References Cited

U.S. PATENT DOCUMENTS 1,011,324  12/1911  Darling .................................. 294/90

FOREIGN PATENT DOCUMENTS 2227211  12/1972  France .................................. 294/90

Primary Examiner—James B. Marbert
Attorney, Agent, or Firm—Robert A. Kulason; Robert B. Burns

[57] ABSTRACT

A pulling head adapted to removably engage the end fitting of a conduit to facilitate the latter being pulled with a substantial tensional force. The head includes an engaging ring at one end thereof which is removably operable to register about and firmly engage the cable end fitting. A wire line extending from the pulling head nose end is attachable to a winch or other mechanism capable of applying the necessary pulling force thereto.

11 Claims, 4 Drawing Figures

PULLING HEAD FOR REMOVABLY ENGAGING A CONDUIT END

BACKGROUND OF THE INVENTION

In the normal practice of pulling cables or other flexible conduits, a considerable force must be initially applied to the cable to draw it from its reel or other holding mechanism. When the conduit is being drawn through a relatively spacious receptacle or even through an environment where it is unconfined, the pulling head utilized for applying the necessary pulling tension has virtually no limitations as to size. When, however, the conduit is to be pulled through aconfined conduit guide or other member, said member must be sufficiently large to permit the conduit as well as its pulling mechanism to pass therethrough.

Where the conduit guide is of relatively small diameter, the pulling head must likewise be sufficiently small to advance along the guide. Further it must advance without becoming entangled, jammed, or otherwise subjected to conditions that would cause the guide to be damaged.

In the instance of offshorre or subsea operations related to production of hydrocarbon liquids or gas, such flexible conduits are normally utilized in several capacities. Primarily they can be utilized for carrying a liquid or gas between an offshore location such as a drilling platform, to the shore. Alternately, the conduits may comprise conductors or electrical circuitry for communicating a remote well head to the control center located on the marine platform.

Normally in the instance of any offshore platform which is adapted to cover an expansive subterranean field or reservoir, the platform will be communicated to a number of remote well heads by way of conduits and electrical cables in the manner above stated. A primary feature which urges utilization of flexible type conduits is that they are more readily handled and can be installed without concern for their rigidity. Thus, they can be bent and adjusted to some extent to facilitate their being laid onto the ocean floor.

In the instance of many offshore or marine platforms, the structure is originally designed in contemplation of drilling a predetermined number of wells into a subterranean hydrocarbon containing reservoir. Thus, the platform is originally designed with a fixed number of conductors which are so positioned that each can readily accommodate a descending drill string. Therefore a well can be subsequently completed into a working unit through each conductor.

A platform of this nature is fixed and stable once it is piled into the ocean floor. It can however, be subsequently adapted to accommodate additional remotely located wells. This is achieved most readily by the provision of flexible conduits that extend from the platform, to the various well heads. The latter can then be operated from the platform, and further the product drawn from the well can be conducted to the platform processing equipment.

In such an instance, when it is desired to install additional conduits onto a platform for the above noted purpose, the conduits, wound on reels, are usually positioned on the platform. Thereafter, they are drawn by a pulling mechanism downwardly through one of the drilling conductors and out to the sea bed for connection to a conventional flowline.

The conduit installation operation can be achieved in a number of ways. However, in each instance it is necessary to firmly grasp the end of the flexible conduit, and exert enough axial pull that it can be unwound from its reel. It is thereafter pulled with a sufficient force that it will be positioned as desired on the ocean floor.

What is presently disclosed as a pulling head for removably engaging the end fitting of a flexible conduit or cable so that the latter can be forcefully drawn from a reel or the like. The head is adapted to engage the formed end of a cable fitting thereby establishing a sufficiently firm grip on the conduit that the needed pulling force can be appied thereto.

What is further provided is a pulling head of the type described which is of a diameter that it does not substantially exceed the diameter of the conduit being pulled. Thus, the flexible conduit can be drawn through a minimal sized guide or drilling conductor without concern that the pulling head will cause damage to the guide passage or to other members which it contacts during the pulling step.

It is therefore an object of the invention to provide a pulling head for a flexible conduit or similar cable type element, which pulling head is readily removable from the conduit end fitting. A further object is to provide a pulling head of the type contemplated which is capable of exerting an axial force to a conduit while drawing the latter through a limited size guide passage.

In achieving these objectives, the presently disclosed conduit pulling head is provided. The latter includes primarily a multi-segment ring or collar member that is adapted to be positioned on, and firmly grasp the end fitting of a conduit to be pulled. A nose piece detachably engages the ring and includes a wire line or similar member which can be of any desired length such that it can be connected to a pulling element such as a winch, a motor or the like.

DESCRIPTION OF THE DRAWINGS

Referring to FIG. 1 of the drawings, conduit or cable 10 which is to be unwound from a reel or other holding mechanism is here shown. It can be characterized as previously noted, by an internal structure which would permit carrying of a produced product therethrough or merely enclosing a number of control elements such as electrical, pneumatic or hydraulic lines. The lines are protected by a heavy, flexible outer sheath or jacket.

Figure 1:
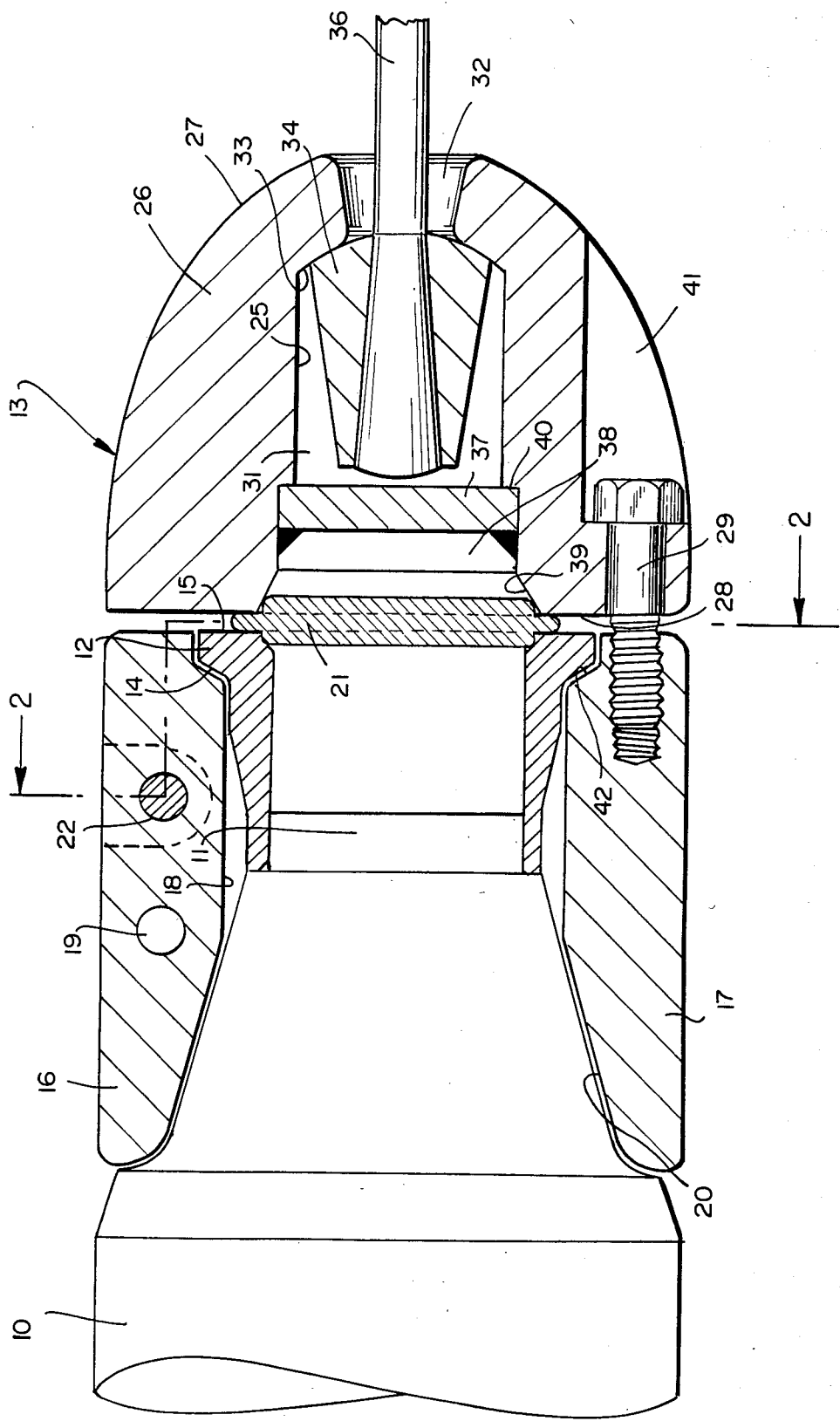
FIG. 1 is a vertical cross sectional view taken along a pulling head of the type contemplated which is fixed to the end of a flexible conduit.

To facilitate pulling a conduit 10 to achieve its unreeling and positioning at a desired location, the conduit end is provided with a hub 11 which firmly engages, and is fixed thereto. When the conduit is finally in position, hub 11 is sealably joined with a corresponding hub by an external clamp or the like.

An end fitting 11 of this type is typified by a Grayloc Hub which is capable of being firmly fastened to the end of a conduit. Said hub is comprised primarily of a cylindrical body having an outer diameter which is substantially smaller than the outer diameter of conduit 10. Further, hub 11 is provided with a rim 12, and with a recessed face 15 that receives a deformable metallic seal ring 21. The latter can be compressed as will be herein described, by a corresponding hub to define an annular water tight joint thereby protecting the conduit interior from exposure to water.

In the embodiment shown, the hub 11 is characterized by annular rim 12 disposed outwardly of the hub body, and having a sloping pressure surface 14. The latter is at a sufficient angle to allow the application of maximum axial pulling force thereto, and yet minimize the diameter of the hub.

Pulling head 13 which is adapted to removably engage hub 11 includes a first clamping ring section which is comprised of a plurality of discrete ring segments 16 and 17. This section can be comprised of two or more elements, all of which when properly assembled define a unitary body having an internal axial passage 18 with an inner, tapered contact portion 20.

Figure 2:
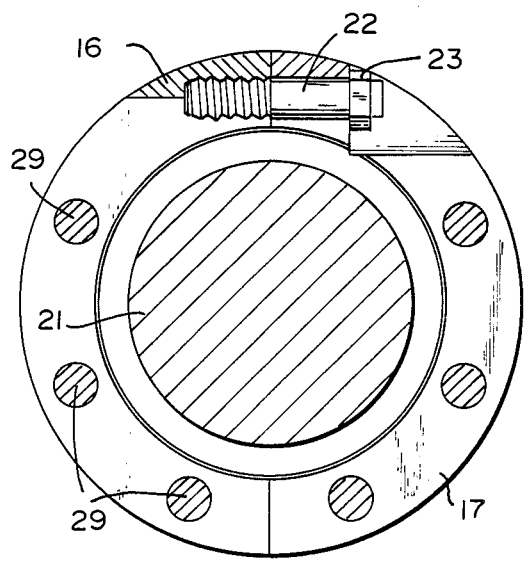
FIG. 2 is a cross-sectional view taken along line 2—2 of FIG. 1.

Individual ring segments 16 and 17 as shown in FIG. 2, are arcuate, or semi-circular when two are utilized. When assembled together the respective segments define an elongated sleeve or cylindrical body. Said unit is characterized by an outer diameter which is equal to or substantially equivalent to the diameter of conduit 10. It further includes a peripheral bearing shoulder 42 on the wall of axial passage 18.

To facilitate assembly of segments 16 and 17 into their clamping mode, said members can include one or more alignment pins or screws 19. The latter are positioned to register within a corresponding hole in the adjacent ring segment. Alternately, said pins can be replaced by a transverse fastening stud or bolt 22.

A plurality of such fastening bolts or studs 22 extend transversely of the assembled ring segments to maintain the latter firmly in gripping position. A locking nut 23 is carried on each stud or locking bolt 22. Each ring segment is provided with one or more recesses 24 which allow nut 23 to be lodged within the outer periphery of the assembled clamping ring section.

The leading end of pulling head 13 is provided with a nose piece 26 comprised of a generally hemispheric shaped member which is formed of steel or a similar, durable metal. The forward face 27 of nose piece 26 is preferably provided with a smooth contoured surface to facilitate its sliding movement through a guide or similar member as will be hereinafter noted.

The rear surface 28 of nose piece 26 is disposed in abutting engagement with seal ring 21. A plurality of clamping bolts 29 maintain nose piece 26 and the clamping ring section in axial alignment with seal ring 21 compressed against hub 11 face to thereby form a water tight enclosure at the end of conduit 10.

Nose piece 26 is provided with an axial cavity formed in rear face 28 and extending therethrough in progressively decreasing cylindrical sections. The inner cylindrical section 25 defines a forward chamber 31 having an outwardly divergent access port 32 communicating said chamber with the exterior.

The forward wall 33 of chamber 31 is provided with a contoured or arcuate surface to slidably accommodate the expanded anchor piece 34 at the end of connecting wire or cable 36, which registers within access opening 32. Said forward wall 33 of chamber 31 is of sufficient thickness that when a pulling tension is applied to cable 36, the resulting pressure transmitted through the nose piece, will cause the entire pulling head 13 to be drawn in the direction of the cable pull.

Anchor piece 34 as shown, comprises generally a truncated cone which is of sufficient length to be movable within forward chamber 31 thereby allowing pulling cable 36 a degree of lateral flexibility without exerting or over straining either the cable or the nose piece.

The nose piece axial cavity further includes a peripheral shoulder 40 which positions a transverse plate 37. The latter is welded peripherally in place against shoulder 40 to assure a liquid tight joint.

Said transverse plate 37 defines a rear chamber 38 which is closed at its remote end by engagement of nose piece rear surface 28, with seal ring 21.

The nose piece axial cavity terminates at a peripheral tapered seat 39 which, when the nose piece and the clamping ring 21 are drawn together by bolts 29, will cause the seal ring 21 to deform thereby assuring water tight integrity of the annular sealed joint thereby formed.

Figure 3:
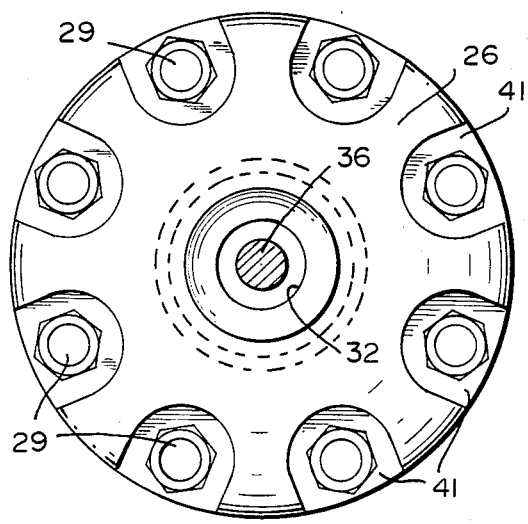
FIG. 3 is an end view of the apparatus along line 3—3 of FIG. 1.

As seen in FIG. 3, the plurality of clamping bolts 29 which hold the nose piece 26 and the clamping ring assembly in tightened, sealed engagement, are disposed along a bolt ring adjacent to the edge of the nose piece. A series of grooves 41 formed longitudinally into the nose piece 26 accommodate bolts 29 in a manner to permit insertion and removal thereof as required with a rotatable socket tool. Further the heads of bolts 29 are positioned below the surface of forward face 27 to avoid contact with a guide member during a conduit pulling operation.

Operationally, when a conduit 10 is to be unwound from a reel on the deck of an offshore platform or vessel, the conduit will have previously been provided with a hub or end fitting 11. Since the pulling head 13 will be drawn through an elongated conductor extending downwardly through the marine platform to the ocean floor, the forward end of the pull wire or cable 36 will preferbly be communicated with a messenger wire which is initially lowered through the elongated conductor. Thus, the wire lower end can be engaged with a pulling mechanism such as a winch or the like.

The discrete clamping segments 16 and 17 are manually positioned about the hub 11 in a manner that the hub is registered within central passage 18 so that tightening of bolts 22 will draw the ring segments into close or abutting engagement. With the plurality of ring segments 16 and 17 properly positioned, they are urged forward by bolts 22 whereby shoulder 42 will contact with pressure surface 14 of annular rim 12.

Fastening bolts 22 can now be drawn tight. Thus, the two ring segments 16 and 17 will be progressively forced into tight engagement with each other, and correspondingly be forced into firm peripheral engagement with hub 11 at surface 14.

As shown, the remote end of the clamping ring section is provided with an outwardly tapered portion 20 which engages the corresponding sections of cable 10 hub 11 whereby the hub unit is rigidly held in place thereby to minimize stress at the juncture of hub 11 and cable 10.

With seal ring 21 positioned at the face 15 of hub 11, nose piece 26 is aligned with hub 11 to bring the respective fastening holes into alignment. Clamping bolts 29 are now inserted into the ring section and drawn tight to bring seat 39 and rear surface 28 into abutting deforming engagement with seal ring 21 thus forming a peripheral sealing surface to avoid entry of water into the conduit as it is drawn from its reel.

Figure 4:
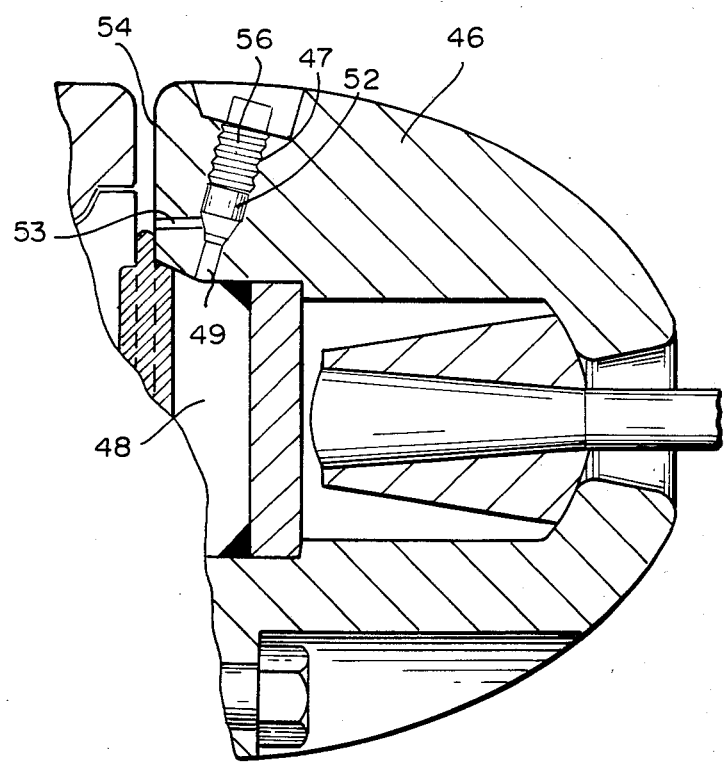
FIG. 4 is a cross-sectional elevation view of an alternate embodiment of the pulling head.

In an alternate embodiment of the disclosed pulling head, as shown in FIG. 4, nose piece 46 is constructed, and functions similarly to nose piece 26 of FIG. 1. Nose piece 46, however, differs in that it is provided with an access port 47 which communicates the rear chamber 48 with the atmosphere. As seen, said access port includes a lower passage 49 which communicates with the rear chamber 48, and a tapered section 51 which receive a tapered shoulder plug 52.

A second passageway 53 which terminates at the rear face 54 of the nose piece 46, intersects said tapered passage 51 to provide controlled communication therebetween.

An insert 56 is urged in threaded engagement with tapered plug 52 whereby the latter bears against the openings to both passages 49 and 53 to preclude passage of fluid through chamber 48.

Functionally, should this feature be utilized in the pulling head, it serves as means to flush air from the rear chamber 48 to facilitate testing procedures which will be performed on the conduit prior to its being utilized.

After a pulling head has drawn conduit 10 to its desired position, the latter will normally rest on the ocean floor. To engage the conduit with a corresponding hub, the pulling head is disengaged from the hub by a diver. This is achieved by first removing bolts 29 so that nose section 26 can be supported. Thereafter, the mating hub is positioned against seal ring 21 and the two hubs are urged thereagainst by a peripheral ring clamp.

Although modifications and variations of the invention may be made without departing from the spirit and scope thereof, only such limitations should be imposed as are indicated in the appended claims.

I claim:

1. The combination with a conduit having an end fitting including a seal member carried at the face of the latter, and having a pressure rim for exerting a longitudinal pulling force on the conduit of;
   a pulling head adapted to removably engage the conduit end fitting with a force applying means, whereby to exert said longitudinal pulling force, said pulling head comprising;
   a plurality of discrete ring segments that cooperatively define an elongated sleeve having an axial opening therethrough which circumferentially registers about said conduit end fitting,
   means forming a peripheral bearing lip in said axial opening,
   a plurality of bolts which extend between adjacent ring segments removably engaging the plurality of ring segments to fix the latter into said elongated sleeve configuration and to position said peripheral bearing lip in abutting engagement with said pressure rim,
   and a nose piece removably engaged in axial alignment with said elongated sleeve to form a liquid tight joint therebetween.

2. In the apparatus as defined in claim 1 including;
   a deformable seal member disposed between said nose piece and said elongated sleeve to form said fluid tight joint.

3. In the apparatus as defined in claim 1 wherein said nose piece includes;
   an axial cavity defining a forward chamber,
   an access opening communicated with said forward chamber, and said tension means being retained within said chamber and registered through said access opening.

4. In the apparatus as defined in claim 3 wherein said tension means includes;
   an elongated cable registered in said access opening, and an anchor piece at the cable end being operably retained in said forward chamber.

5. In the apparatus as defined in claim 4 wherein said forward chamber includes;
   a contoured bearing surface, and said access opening passes therethrough.

6. In the apparatus as defined in claim 5 wherein said anchor piece is slidably positioned against the contoured bearing surface.

7. In the apparatus as defined in claim 3 including; a panel disposed transversely of said axial cavity to segregate the latter into said forward chamber and a secondary chamber.

8. In the apparatus as defined in claim 7 including; fluid flow control means communicated with said secondary chamber.

9. In the apparatus as defined in claim 7 including; fluid flow control means in said nose piece communicated with said secondary chamber.

10. In the apparatus as defined in claim 1 wherein said plurality of ring segments define an outer surface that extends concurrently with the outer surface of said conduit.

11. In the apparatus as defined in claim 1 wherein the diameter of said nose piece is substantially equal to the outer diameter of said elongated sleeve.

* * * * *